United States Patent [19]

Addicott et al.

[11] 4,370,582

[45] Jan. 25, 1983

[54] AXIAL GAP SQUIRREL CAGE INDUCTION ELECTRIC MOTOR

[75] Inventors: Roy W. Addicott, Burnham-on-Sea; Bernard Capaldi, Woolavington, both of England

[73] Assignee: Sealed Motor Construction Company, Limited, England

[21] Appl. No.: 195,436

[22] Filed: Oct. 9, 1980

[30] Foreign Application Priority Data

Oct. 18, 1979 [GB] United Kingdom ............... 7936228

[51] Int. Cl.³ ........................................... H02K 3/06
[52] U.S. Cl. .................................... 310/211; 310/216; 310/268
[58] Field of Search ............... 310/210, 211, 212, 268, 310/216, 179-183, 51, 166, 154, 156

[56] References Cited

U.S. PATENT DOCUMENTS

| 1,861,059 | 5/1932 | Johnson | 310/211 |
| 1,897,184 | 2/1933 | Zopp | 310/211 |
| 2,159,695 | 5/1939 | Gorham | 310/211 |
| 2,550,571 | 4/1951 | Litman | 310/211 |
| 2,861,205 | 11/1958 | Kober | 310/268 |
| 2,873,395 | 2/1950 | Kober | 310/268 |
| 2,880,335 | 3/1959 | Dexter | 310/216 |
| 2,956,189 | 10/1960 | Buss | 310/268 |
| 3,013,168 | 12/1961 | Ellis | 310/211 |
| 3,685,142 | 8/1972 | Deming | 310/211 |

FOREIGN PATENT DOCUMENTS

| 10685 | 5/1980 | European Pat. Off. | 310/42 UX |
| 2846280 | 4/1979 | Fed. Rep. of Germany | 310/268 |
| 2741036 | 5/1979 | Fed. Rep. of Germany | 310/211 |
| 1546584 | 5/1979 | United Kingdom | 310/211 |

Primary Examiner—R. Skudy
Attorney, Agent, or Firm—Larson and Taylor

[57] ABSTRACT

The stator (21) of the motor is of annular form, with generally radial slots (22) which receive the energizing windings. The squirrel cage of the rotor has a magnetic component (16) and a conductive component comprising inner ring (10) and outer ring (12) joined by bars (14). The bars (14) are curved so as to follow a path with a higher radial component at the inner end than at the outer end. This reduces perceived noise by avoiding sharp registering of the rotor bars with the stator slots, and also by providing a more uniform ratio of magnetic to conductive material in the rotor at different radii around the rotor axis.

3 Claims, 6 Drawing Figures

U.S. Patent  Jan. 25, 1983  4,370,582
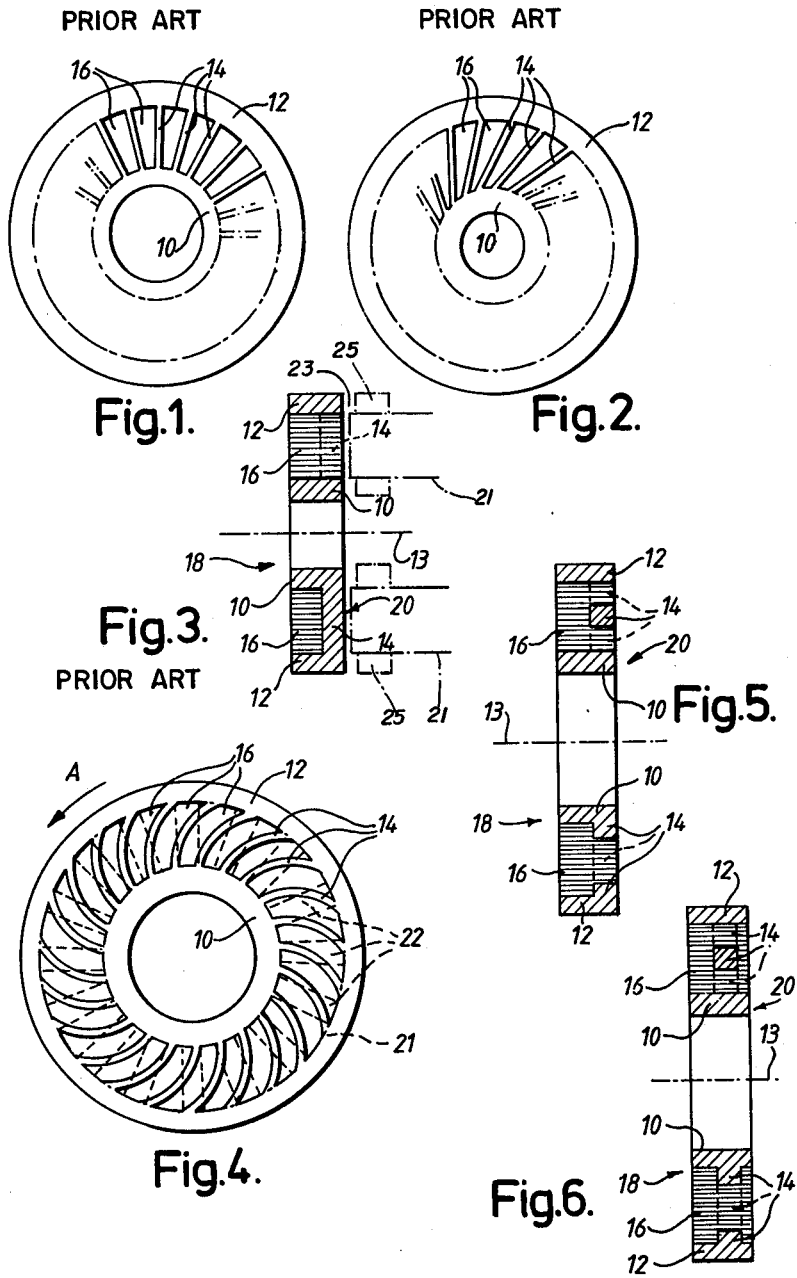

AXIAL GAP SQUIRREL CAGE INDUCTION ELECTRIC MOTOR

This invention relates to induction electric motors of the type in which a disc-like rotor of squirrel cage construction is separated by an axial gap from an energised stator.

In such motors the rotor usually comprises a highly conductive component having radially inner and outer rings joined by generally radial bars, and a ferro-magnetic component, generally iron, which extends into the interstices of the cage formed by the rings and bars of the conductive component. The iron component is usually located as close as practicable to the stator so that the losses caused by the axial iron-to-iron gap between stator and rotor are kept to a minimum. One problem with such motors is that they tend to have high heat losses and generate noise at undesirable frequencies as a result of the interaction of the rotor bars with the varying field of the stator. This variation in the stator field around the machine axis is heightened by the practice of employing a toroidal stator core with a series of slots in one face into which slots the energising windings are placed. The number of slots is greater than the number of poles and results in a correspondingly high number of discrete iron lands separating the slots, in the region of which the magnetic flux tends to be highest. The stator slots can thus be regarded as similar to the conductive rotor bars in this respect in that they represent a series of locations of relatively low axial magnetic flux. The relative rotation of these two components with their annularly varying magnetic flux gives rise to heat losses and much of the undesirable noise. Reducing this noise by providing a continuous annular conductive web instead of the discrete bars in the rotor brings the disadvantage of reduced efficiency because the web creates a further iron-to-iron gap. The invention is therefore concerned with improving the design of squirrel cage rotors so that they can be employed with good efficiency but low perceived noise.

Generally, this is achieved in accordance with this invention by forming the conductive bars of the rotor so that they follow a curved path between the inner and outer conductive rings, the direction of the bars having a higher radial component at their radially inner end than at their radially outer end. Preferably the curvature of the bars is arranged so as to produce a uniform or near uniform ratio of conductive to magnetic material on different radii around the rotor. Further, the number of rotor bars is chosen within the limits of practicality, to produce the smallest number of coincidences of registration between the rotor and stator bars and slots. Also, the skew factor in relation to the stator slot pitch is important; that is, the amount, in relation to the stator slot pitch, by which the radially inner and outer ends of the rotor bars are angularly displaced about the machine axis. A skew factor of between 0.85 and 1.3 has been found to be particularly suitable in relation to practical and other considerations.

U.S. Pat. No. 1,897,184 describes an axial gap squirrel cage motor in which the stator has a number of salient poles spaced at intervals around the motor axis. In order more evenly to distribute the magnetic flux of the stator, the salient poles are provided with pole shoes closely adjacent to and parallel to the rotor. The gap between adjacent pole shoes follows an involute curved path, with the intention that the shape of each pole shoe thereby conforms to the field shape of a distributed winding. In order that the conductive bars of the squirrel cage rotor pass directly from the field of one pole into that of the adjacent pole they are given an involute curved shape matching that of the gap between adjacent pole shoes. It will be apparent that this has no relation to the present invention since the stator does not take the form of a slotted annular core which is particularly associated with the problems discussed above. Moreover, the curved bars in the above patent are not provided to reduce noise, but rather to match the shape of the stator inter-pole gap: a feature which would tend to maximise noise generation rather than reduce it. In addition the curvature of the bars in the above patent is such that there is still substantial radially inward taper to the interstitial iron in the rotor.

In order that the invention may be more clearly understood, one embodiment will now be described with reference to the accompanying drawings, wherein:

FIGS. 1 and 2 show the faces of two conventional prior art rotors, and

FIG. 3 shows a cross-section through such a rotor,

FIG. 4 shows a face view of rotor of the present invention, and

FIG. 5 shows a cross-section through it, and

FIG. 6 shows a cross-section through a modified form of rotor of the present invention.

Referring to the drawings and firstly to FIGS. 1 to 3; a conventional squirrel cage rotor for an axial gap induction motor has a highly conductive component, typically of copper or aluminum, comprising an inner ring 10 and an outer ring 12 joined by bars 14, rather as the spokes of a wheel (not all the bars are shown in full). A ferromagnetic component 16, usually formed from spirally wound iron strip, is located in the interstices between the bars of the conductive component. FIG. 3 is not a diametrical cross-section, but a section on two radii about the machine axis 13, one radial plane passing through a bar 14 and the other through an interstitial iron region. In order that the iron can provide a good flux path on the side remote from the stator, the bars 14 may be of shallower depth than the rings 10,12, as can be seen from FIG. 3, so that there is an unbroken annulus of iron on the side 18 remote from the stator. On the other side 20 the face of the rotor between the rings thus presents a series of alternate iron and copper regions. The bars 16 may be wholly radial, as in FIG. 1, or they may be skewed as in FIG. 2. In each case, however, the iron interstitial regions taper sharply in the radially inward direction. Moreover, if a radial plane is taken through the rotor at a series of angular positions, it will be apparent that in the rotor of FIG. 1 the copper to iron ratio will change sharply according to whether the plane passes through a bar 14 or one of the iron interstices. Even in the skewed bar embodiment of FIG. 2 the copper to iron ratio changes appreciably at different angular positions of a radial plane. Moreover the tapering of the interstitial iron regions is more marked in the skewed bar arrangement, so that the overall proportion of copper to iron increases markedly in the radially inward direction. As shown in FIG. 3, the rotor is journalled with its face 20 adjacent the face of an annular stator core 21 but spaced therefrom by a small axial gap 23. The face of the stator core is provided with radial slots in which are placed the energizing windings 25.

Considering now the embodiment of the invention of FIGS. 4 and 5, the bars 14 follow a curved path changing from a more radial to a less radial direction in going from the inner ring 10 to the outer ring 12. It will be seen that the interstitial iron regions have only a small taper from the radially outer to the radially inner region, so that the overall proportion of copper to iron changes little in the radial direction between the rings 10,12. Furthermore, as can be seen from FIG. 5 the ratio of copper to iron is practically the same even though the radial plane intersect the bars at different relative positions. Actually FIG. 5 is a diametrical cross-section, and the two halves of the section differ because there is an odd number of bars 14 in the rotor.

In FIG. 4 there is shown in broken lines the outline of the adjacent face of the stator 21 with which the rotor is designed to be used. The face of the annular stator core is provided with sixteen radial slots 22 into which the energizing windings are to be fitted to provide for example a two-phase two- or four-pole energised stator. It will be apparent that if the stator were to be superimposed on the rotor of FIG. 1 each radial bar of the rotor would periodically come into alignment with a radial slot of the stator, giving rise to sharp changes in magnetic flux density, which results in noise. Moreover, if two or more bars and slots register simultaneously, the noise intensity is added, and this can produce very high intensity noise at certain frequencies. With the rotor of FIG. 2 the bars, being skewed, do not align precisely with the radial slots of the stator but there is nevertheless interaction because the copper to iron ratio at different radial planes of the rotor still varies appreciably. However, with the rotor of FIG. 4 this variation is much reduced. Furthermore, the number of bars in the rotor is chosen in relation to the number of stator slots so as to minimise, within the limits of practicality, the number of simultaneous interactions between the rotor bars and stator slots. In this case, with sixteen stator slots a rotor having twenty-three bars was chosen. The number of stator slots will generally be an even number, and a multiple of the number of poles produced by the windings, so that the possibilities for such simultaneous interactions is relatively high, but this will be reduced if there is an odd number, especially a prime number; of rotor bars. The actual number of rotor bars is to some extent constrained by the practical limits of maintaining reasonable electrical efficiency and practical difficulties in construction if too many bars are provided.

The curvature of the bars is determined by a number of factors. The internal and external diameters of the stator core will largely, although not necessarily entirely, determine the loci of the radially inner and outer ends of the bars and this limits the amount of bar curvature since too small a radius of curvature will produce too much of a tangential direction to the bars at their radially outer end. This unduly lengthens the bars, thereby increasing their electrical resistance, but also means that the bars have to be thinner, and their cross-section becomes rather irregular towards the radially outer end because of the highly staggered relationship of the slots in adjacent turns of the strip forming the iron component 16 and the fact that in practice these slots are produced by punching the strip before it is wound into toroidal form. This strip pre-punching procedure enables the slots to be formed wholly within the strip instead of along one edge, so that the conductive bars 14 are then located just below the surface 20 of the rotor, as shown in FIG. 6, thereby still further minimising noise emission. The bar curvature is also related to the skew factor of the bars, which desirably is between 0.85 and 1.3 of the stator slot pitch. In the embodiment illustrated in FIG. 4; the stator slot pitch is $22\frac{1}{2}°$ while the skew pitch of the rotor bars is 20°; thereby giving a skew factor of about 0.89. Of course, this does not in itself determine the bar curvature, since straight bars could be provided with such a skew factor. However, if, as is illustrated in FIG. 4, it is required that the rotor bars should have a substantially wholly radial direction at the point where they meet the inner ring 10, then this in combination with the skew factor will determine the curvature. In the embodiment of FIG. 4, the radius of curvature is approximately the same as the diametrical distance between the inner and outer rings, which in this case matches the difference between the internal and external diameters of the stator core (although the rotor iron could have somewhat larger internal and external diameters than the stator core so as to account for fringe flux leakage).

The rotor could be arranged to turn in either direction, but it has been found that the best results are generally obtained if the rotor rotates, in relation to the skew of the bars, in the direction indicated by the arrow A in FIG. 4.

We claim:

1. An axial gap squirrel cage induction motor comprising an annular stator presenting an annular face, and a rotor presenting a face towards said annular face of the stator, said stator and rotor faces defining between them an axial gap; the stator comprising an annular core of magnetic material and having radial slots formed in the annular face of the core adjacent the axial gap, in which radial slots are located energizing windings for the stator, whereby said face of the stator presents a series of regions of alternately magnetic and non-magnetic material provided respectively by the unslotted portions of the stator core and the material of the energizing windings located in the slots; the rotor comprising a magnetic component and a non-magnetic conductive component, the non-magnetic conductive component comprising radially inner and outer rings joined by a series of bars spaced apart to define interstitial regions there between, the magnetic component occupying said interstitial regions, whereby the rotor between said rings has directly opposite said face of the stator adjacent the axial gap an annular portion formed of a series of alternately non-magnetic and magnetic material provided respectively by said bars and said interstitial magnetic material; said bars of the rotor following a curved path between the inner and outer conductive rings, the direction of the bars having a higher radial component at their radially inner end than at their radially outer end such that the curved conductive bars of the rotor do not register with the radial slots in the stator when viewed in the axial direction.

2. A motor according to claim 1 wherein the curvature of the bars is arranged so as to produce a substantially uniform ratio of conductive to magnetic material on different radii around the rotor.

3. A motor according to claim 1 or claim 2 wherein the skew factor, that is, the amount, in relation to the stator slot pitch, by which the radially inner and outer ends of the rotor bars are angularly displaced about the machine axis, is in the range 0.85 to 1.3.

* * * * *